United States Patent
Simonis et al.

(10) Patent No.: US 12,470,079 B2
(45) Date of Patent: Nov. 11, 2025

(54) METHOD FOR OPERATING A USER INTERFACE FOR SELECTING A CHARGING STRATEGY FOR A DEVICE BATTERY AND FOR OPERATING THE DEVICE BATTERY AS WELL AS A USER INTERFACE

(71) Applicant: Robert Bosch GmbH, Stuttgart (DE)

(72) Inventors: Christian Simonis, Leonberg (DE); Christoph Kroener, Freiberg Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 558 days.

(21) Appl. No.: 18/056,776

(22) Filed: Nov. 18, 2022

(65) Prior Publication Data

US 2023/0163618 A1 May 25, 2023

(30) Foreign Application Priority Data

Nov. 19, 2021 (DE) ...................... 10 2021 213 057.7

(51) Int. Cl.
*H02J 7/00* (2006.01)
(52) U.S. Cl.
CPC .......... *H02J 7/00712* (2020.01); *H02J 7/005* (2020.01)
(58) Field of Classification Search
CPC .................................................... H02J 7/0071
See application file for complete search history.

(56) References Cited

U.S. PATENT DOCUMENTS

| 8,922,329 | B2 * | 12/2014 | Davis | H02J 50/90 340/5.1 |
| 11,376,981 | B2 * | 7/2022 | Lee | B60L 53/64 |
| 2011/0191220 | A1 * | 8/2011 | Kidston | B60L 3/04 705/412 |

(Continued)

FOREIGN PATENT DOCUMENTS

| DE | 102018131784 A1 * | 6/2020 | ......... G01C 21/3469 |
| DE | 10 2019 108 607 B3 | 10/2020 | |

(Continued)

*Primary Examiner* — Daniel Kessie
(74) *Attorney, Agent, or Firm* — Maginot, Moore & Beck LLP

(57) ABSTRACT

A computer-implemented method for operating a user interface for specifying a charging strategy for charging a device battery of a battery-operated device includes detecting a historical usage pattern of an operation of the device battery, and specifying a plurality of different charging strategies. Each charging strategy having a corresponding charging curve for charging of the device battery. The method further includes determining an aging indication for each of the charging strategies based on (i) the historical usage pattern, and (ii) an assumption that all future charging processes for charging the device battery are performed using a relevant charging strategy of the plurality of different charging strategies. The method also includes informing a user about a relevant characteristic variable for each of the charging strategies and the respectively associated aging indication, and specifying one of the charging strategies for future charging processes corresponding to a received user selection.

11 Claims, 3 Drawing Sheets

(56) References Cited

U.S. PATENT DOCUMENTS

| | | | | |
|---|---|---|---|---|
| 2013/0030593 A1* | 1/2013 | Gao | ................... | H02J 7/0047 |
| | | | | 320/155 |
| 2014/0055087 A1* | 2/2014 | Causey | ................ | H02J 50/10 |
| | | | | 320/108 |

FOREIGN PATENT DOCUMENTS

| | | |
|---|---|---|
| DE | 10 2020 206 257 B3 | 6/2021 |
| WO | 2020/224724 A1 | 11/2020 |

\* cited by examiner

METHOD FOR OPERATING A USER INTERFACE FOR SELECTING A CHARGING STRATEGY FOR A DEVICE BATTERY AND FOR OPERATING THE DEVICE BATTERY AS WELL AS A USER INTERFACE

This application claims priority under 35 U.S.C. § 119 to patent application no. DE 10 2021 213 057.7, filed on Nov. 19, 2021 in Germany, the disclosure of which is incorporated herein by reference in its entirety.

The disclosure relates to electrical devices that are operated in a mains-independent manner and can be operated with different usage profiles so that a device battery used is subject to a usage-dependent load. In particular, the disclosure relates to providing an option for specifying a charging strategy for the device battery in a specific and informed manner.

BACKGROUND

The supply of energy to electrical devices and machines operated in a mains-independent manner, such as electrically drivable motor vehicles, generally takes place by means of device batteries or vehicle batteries. These supply electrical energy for operating the devices.

Device batteries degrade over their service life and depending on their load or usage. This so-called aging leads to a continuously decreasing maximum power or storage capacity. The aging state corresponds to a measure for indicating the aging of energy stores. According to the convention, a new energy store has an aging state with respect to its available capacity of 100%, which noticeably decreases over the course of its service life. A measure of aging of the device battery (change in the aging state over time) depends on an individual load on the device battery, i.e., in the case of vehicle batteries of motor vehicles, on the usage behavior of a driver, external ambient conditions and on the type of vehicle battery.

In order to evaluate a technical failure risk, an indication of an expected remaining service life is relevant to the user of a device battery, such as a vehicle battery of an electric vehicle. In particular, the degradation of a device battery depends on the charging strategy applied if the usage behavior is assumed to be substantially constant. For influencing the aging of the device battery, the user usually only has the option of choosing between rapid charging or gentle charging of the device battery. However, the individual influence on battery aging is non-transparent to the user.

SUMMARY

According to the disclosure, a method operates the user interface for specifying a charging strategy for charging a device battery, and a user interface provides an input option.

According to a first aspect, a computer-implemented method for operating a user interface for specifying a charging strategy for charging a device battery of a battery-operated device is provided, comprising the following steps:
 detecting a historical usage pattern of the operation of the device battery;
 specifying a plurality of different charging strategies, each determining a charging curve during charging of the device battery;
 determining an aging indication for each of the charging strategies depending on the historical usage pattern and under the assumption that all future charging processes for charging the device battery are performed using the relevant charging strategy;
 informing a user about a relevant characteristic variable for each of the charging strategies and the respectively associated aging indication; and
 specifying one of the charging strategies for future charging processes corresponding to a received user selection.

During its use, a device battery of a battery-operated device is subject to operating cycles, such as an operating cycle, a rest cycle or a charging cycle. For a specific application, the type of use of the device determines the load on the device battery and thus its degradation or aging behavior.

In the case of device batteries, the aging state (SOH: State of Health) is the key variable for indicating a remaining battery capacity, which indicates a maximum storage capacity and thus the benefit of use. The aging state represents a measure of the aging of the device battery. In the case of a device battery or a battery module or a battery cell, the aging state may be indicated as a capacity retention rate (SOH-C). The capacity retention rate SOH-C is given as the ratio of the measured current capacity to an initial capacity of the fully charged battery. With increasing aging of the device battery, the aging state (SOH-C) related to the battery capacity decreases. Alternatively, the aging state may be given as an increase in internal resistance (SOH-R) with respect to internal resistance at the start of the service life of the device battery. The relative change in the internal resistance SOH-R increases with increasing aging of the battery.

The aging state of an electrical energy store, in particular a device battery, is usually not measured directly. This would require a number of sensors inside the energy store, which would make the production of such an energy store costly, as well as complex, and would increase the space requirement. Moreover, measurement methods suitable for everyday use for direct determination of the aging state in the energy stores are not yet available on the market.

Approaches for providing user-specific and usage-specific modeling and prediction of an aging state of the electrical energy store based on an aging state model that uses a temporal profile of operating variables, e.g., from the time of the initial operation, in order to determine the aging state, in each case, time step by time step, starting from the aging state at the time of the initial operation, according to a time integration method, are promising. Such an aging state model can be implemented in the device or in a central unit (cloud) remote from the device and can be parameterized or trained by means of operating variables of a multiplicity of battery devices that are in communication connection with the central unit.

The aging, in particular the speed of aging, depends on a usage behavior of the device by a user. Frequent rapid charging basically allows the battery to age more quickly. In contrast, charging at lower charging currents over a longer period of time preserves the battery. However, the user of the battery-operated device can generally influence the type of use of the device. The user can thus change a charging strategy, which substantially manifests as a changed charging time. For example, an extended charging time may be tolerable for the user in some circumstances, if, for example, charging usually takes place overnight.

Furthermore, the charging strategies can be specified by a maximum permissible charging current, a desired charging time or a charging profile for specifying a maximum permissible charging current depending on a charging state, wherein the characteristic variable for the charging strategies corresponds to a charging time, in particular for a specified increase in the charging state.

Due to the higher current and temperature load, which is associated with faster charging of the device battery, there is a conflict of objectives between a speed of aging of the device battery and the charging time, which can be set specifically by a user. While the user until now has generally had the option to choose between two charging strategies, namely normal charging and rapid charging, the user can assess the influence on the actual aging and the resulting remaining service life of the device battery only with difficulty. Accordingly, according to the disclosure, a user interface is provided which enables the user of a battery-operated device to recognize the effects of the operation of the device and to influence the type of use of the device battery in an informed manner.

For this purpose, predictions of the aging state profile are performed as a function of a predicted usage pattern of the battery-operated device. For this purpose, a historical usage pattern can be used for a usage prediction of the predicted usage pattern, for example. The predicted usage pattern in turn enables an aging prediction.

The user can generally influence the type of use of the device in the operating cycles only to a limited extent if the usability of the device is not to be reduced. However, the user can specify a charging strategy which determines the manner in which a charging process is performed during a charging cycle.

The historical usage pattern can be indicated by a temporal operating variable profile of at least one of the operating variables of a battery current, a battery voltage, a battery temperature and a charging state.

In particular, the temporal operating variable profile can be predicted, wherein, in the prediction of the operating variable profile, profile sections of predicted charging processes are replaced in each case by an operating variable profile assigned to the specified charging strategy, wherein the aging indication is determined by means of an aging state model based on a time integration method, depending on the predicted operating variable profile or on an operating variable profile from a consolidation of the historical operating variable profile and the predicted operating variable profile.

Furthermore, the aging indication can correspond to a mean aging gradient, a remaining service life or an aging state after a predetermined period of time.

The usage pattern may be determined based on the historical usage pattern resulting from current profiles and temporal profiles of operating cycles, rest cycles and charging cycles. By means of a suitable method, the historical usage patterns can be predicted into the future in order to obtain a predicted usage pattern. By means of an aging state model, a corresponding predicted aging state profile can be determined from the predicted usage patterns. The aging state profile enables an evaluation of the aging speed and of a remaining service life or total service life of the device battery.

The above method for operating a user interface, starting from historical usage patterns, in particular in the form of an operating variable profile, provides for generating a plurality of predicted usage patterns, which in each case take into account a charging strategy that can be selected by the user for the charging cycles from a plurality of charging strategies. Thus, an assignment of a relevant charging strategy to a predicted usage pattern and to an aging state profile or remaining service life determination derived therefrom is available.

For this purpose, the desired charging strategy can be consolidated with the typical user behavior (for discharging and parking phases) to form a time series and can be provided as a predicted operating variable profile for a simulation with the aging state model. This results in a predicted aging state profile which can be used to determine a predicted aging state, to determine a predicted aging state profile (aging state trajectory) and to monitor the actual aging behavior.

The model-based approach for generating the driver-specific charging curves, together with an over-the-air update controlled by a central unit (cloud), allows high flexibility in order to select an optimal compromise on the basis of the user preference in view of the conflict of objectives between battery service life and charging rate or charging strategy.

The above user interface provides for initially using the usage patterns predicted for various charging strategies, in order to determine a relevant aging state profile. Depending on the aging state profiles determined in this way, assistance can be provided to a user in the selection of the suitable charging strategy. For example, a characteristic variable for the selectable charging strategies, such as a resulting expected charging time (when the charging state increase is specified) or a resulting expected charging rate with respect to a characteristic variable for the aging behavior (aging indication), such as an aging gradient or a remaining service life, can be provided or displayed. The user can now make a selection of a suitable charging strategy in an informed manner, since the user immediately recognizes what influence the selection of the charging strategy has on the aging of the device battery.

Furthermore, the user can be incentivized by attractive insurance policy conditions to select a battery-conserving charging strategy. Furthermore, it is conceivable for there to be a usage-based or aging-dependent usage fee for the battery or that the insurance policy for the battery is usage-based or aging-dependent.

Furthermore, a predicted aging state trajectory can be provided in accordance with the selected charging strategy, wherein an automatic adjustment of the charging strategy to a charging strategy with a lower load for the device battery takes place or a user is prompted to change the charging strategy if a limit value of the aging state indicated by the predicted aging state trajectory is violated by the actual aging state.

According to one embodiment, the user interface can provide an input option via which the user can select one of the charging strategies.

The characteristic variable for the charging strategy and the aging indication for the charging strategies can be displayed via the user interface in the form of a Pareto-optimal or Pareto-efficient curve, referred to below as Pareto curve, which is formed for at least two charging strategies which are Pareto-optimal in the conflict of objectives between aging and charging time of the device battery.

In addition, the prediction of the usage pattern and of the predicted aging state profile resulting therefrom can be provided with corresponding confidences so that in the indication of the aging gradient or the remaining service life, a prediction uncertainty or the confidence can additionally be indicated, which can furthermore serve as a decision aid for the selection of the charging strategy.

Furthermore, a usage certificate of the device battery can be created, which indicates and evaluates the charging strategy selected by the user over the calendrical aging. For example, it can be noted in a usage certificate if the user always selected a battery-saving charging strategy.

According to a further aspect, an apparatus, in particular a user interface, for carrying out the above method is provided.

BRIEF DESCRIPTION OF THE DRAWINGS

Embodiments are explained in more detail below with reference to the accompanying drawings. In the drawings.

DETAILED DESCRIPTION

Figure 1:
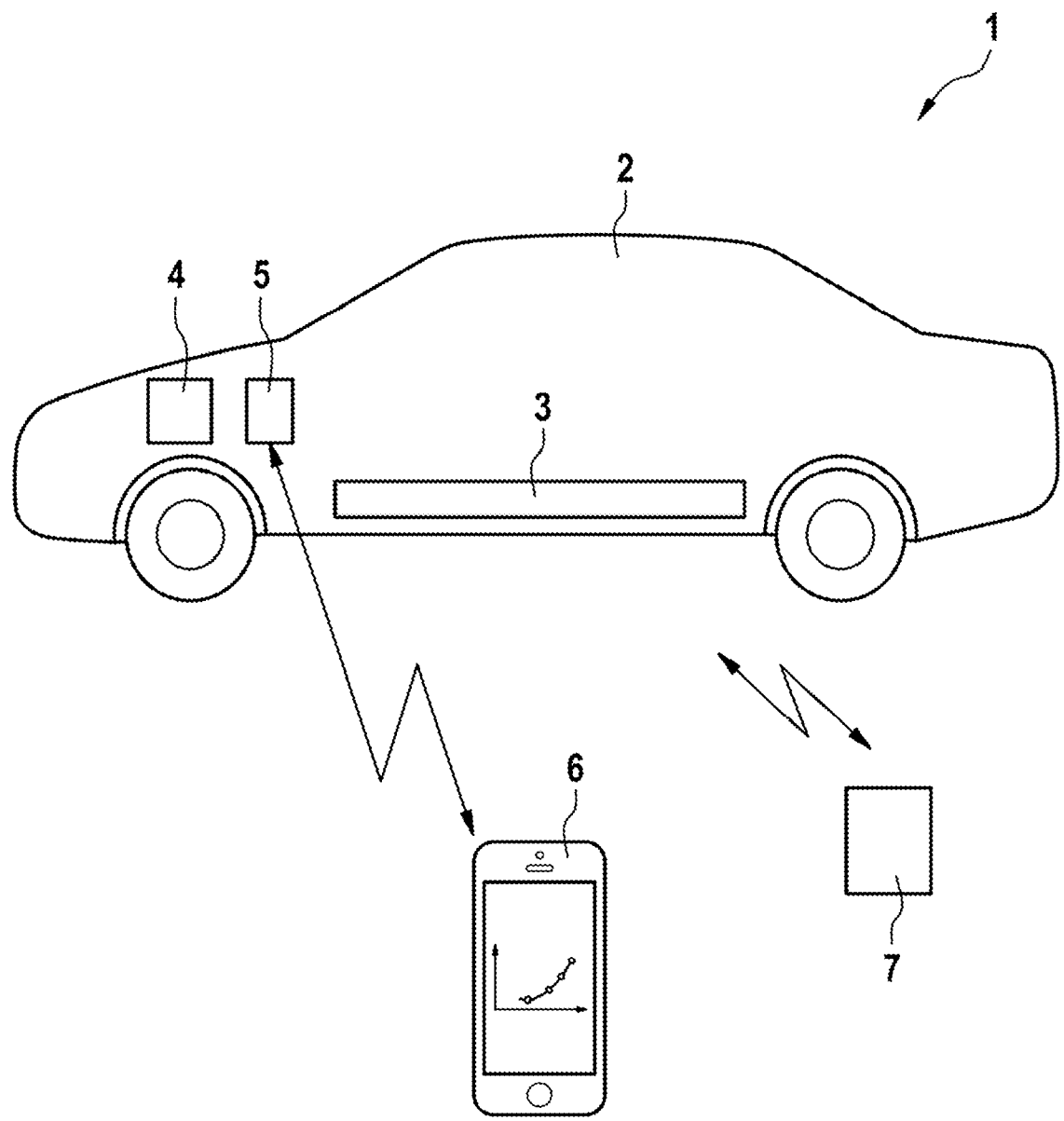
FIG. 1 is a schematic representation of an overall system of a vehicle with a vehicle battery and a user interface in a mobile end device.

FIG. 1 shows a system 1 with an electric vehicle 2 as an exemplary device, which is operated with a vehicle battery 3 as an example of a device battery in a manner known per se. The operation of the vehicle battery 3 is generally performed in successive operating cycles, rest cycles and charging cycles.

The electric vehicle 2 has a control unit 4 which specifies the operating strategy for the vehicle battery 3 and which can interpret a specified charging curve and forwards the relevant control signals, in particular with respect to the charging current. Furthermore, a communication interface 5 is provided in order to communicate with a user interface 6.

The user interface can be designed in the form of a mobile end device, such as a smartphone, or can also be formed via an input/output device fixedly installed in the vehicle.

By means of the user interface 6, the user can obtain information about the effects of a charging strategy to be selected on an aging behavior of the vehicle battery 3 and can, in a suitable manner, specify to the control device 4 a charging strategy for operating the vehicle battery 3. The user interface 6 can have an image output device and an input option, such as a touch input option.

The charging strategies can be determined, for example, by a desired charging time, a desired maximum charging current and/or by charging profiles which indicate a dependence of the maximum permissible charging current on a charging state as a charging curve. In addition, temperature-dependent maximum permissible charging currents can be specified in a rule-based manner. The set of charging strategies provided can provide charging strategies for gentle charging and for rapid charging.

If the charging strategy is specified as a charging time, a corresponding charging curve can be generated. For this purpose, a simulation of kinetic parameters by means of an electrochemical battery model can be used. Using the simulation, a profile of the maximum permissible charging current is created as a function of the charging state as a charging curve such that the anode potential as a kinetic parameter does not exceed a specified critical anode potential.

The vehicle 2 can be in communication connection with a central unit 7, which is formed externally to the vehicle. In the central unit 7, a predicted aging state or a predicted aging state trajectory can be calculated, for example.

Figure 2:
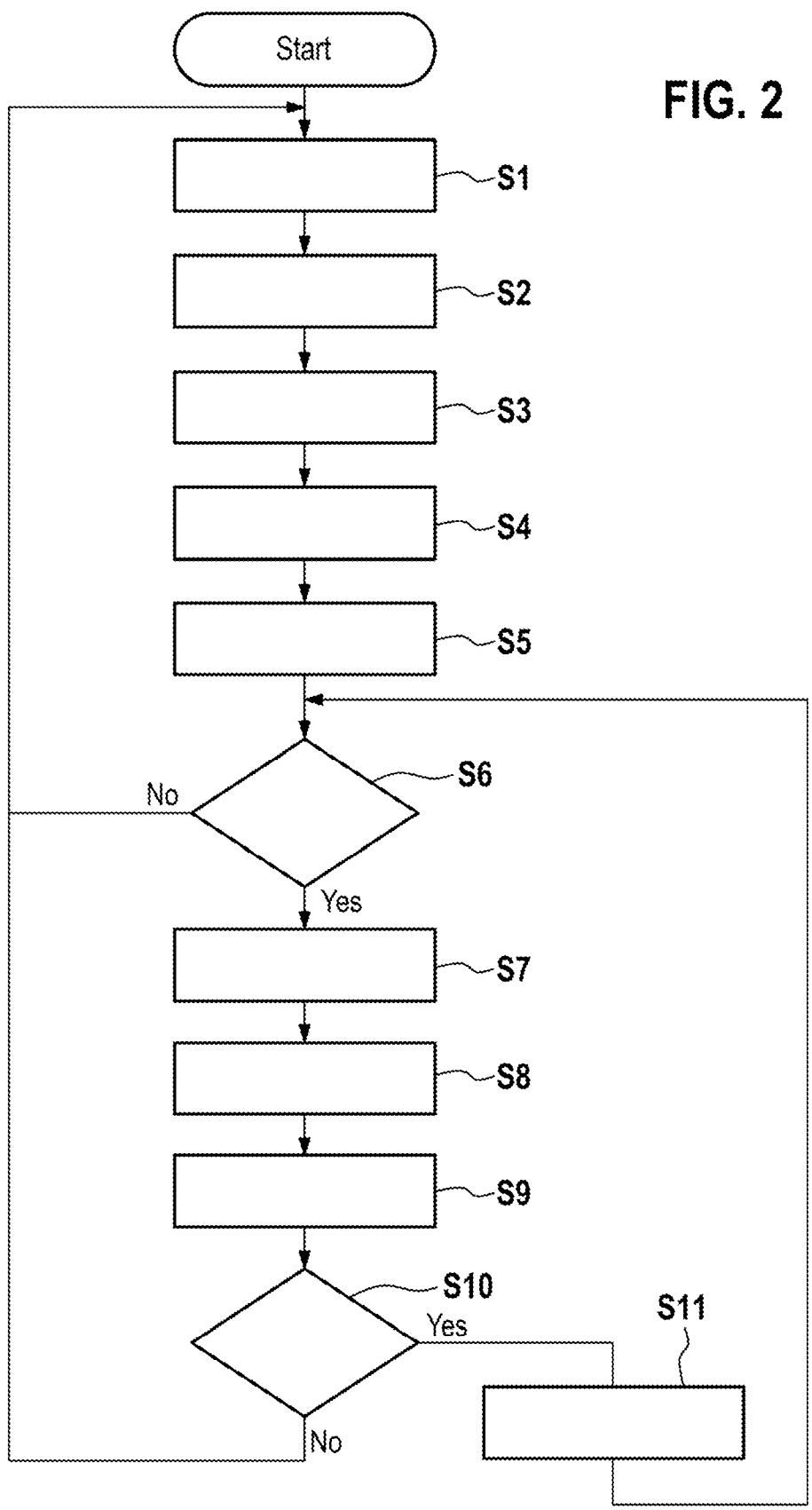
FIG. 2 shows a flow chart for illustrating a method for operating the user interface.

FIG. 2 shows a flow chart for illustrating a method for operating the user interface 6.

In step S1, operating variables of the vehicle battery 3 are initially continuously detected in the form of a temporal operating variable profile of one or more operating variables. The operating variables can, for example, comprise a battery current, a battery voltage, a battery temperature and a charging state.

In step S2, a predicted operating variable profile is artificially generated based on the detected or provided historical operating variable profiles, which predicted operating variable profile is derived from the type of use of the vehicle battery in the past. The predicted operating variable profile represents a load profile for the vehicle battery 3 distributed over the prediction horizon.

Various methods are known for determining the predicted operating variable profile.

For example, a predicted operating variable profile of one or more operating variables can be determined by means of machine learning methods using a pre-trained prediction model based on the historical operating variable profile as input.

In a further simple case, time segments or sequences of a historical operating variable profile can be put together starting from the current point in time into the future in order to determine a possible predicted operating variable profile.

Furthermore, the historical operating variable profile can be analyzed in order to detect temporal phases of an operating cycle, a rest cycle and a charging cycle. The individual cycles can now be assigned to one or more operating cycle profiles, one or more rest cycle profiles and one or more charging cycle profiles, which represent different loads for the vehicle battery. The assignment to the cycle profiles can take place according to load characteristics, which are determined from the operating variable profile of the individual cycles. Such load characteristics may include, for example, the average Ah throughput, a maximum battery current, a mean battery temperature, and similar aggregated variables that may indicate a load on the vehicle battery. The assignment of the individual cycles to cycle profiles can now take place, for example, by means of a clustering method. The sequence of the individual cycles results in a sequence of the correspondingly assigned cycle profiles, which represent a historical usage pattern for the historical operating variable profile. Thus, a temporal sequence of driving cycles, rest cycles and charging cycles with respect to the calendrical age of the vehicle battery 3 can be determined from the continuously provided operating variable profile.

The historical usage pattern characterizes the type of use of the vehicle battery 3 in the past up to the current point in time. The continuation of the historical usage patterns into the future by means of suitable extrapolation methods by concatenating corresponding cycle profiles enables the determination of a predicted usage pattern. In particular, calendrical cycles, such as weekly cycles, monthly cycles and seasonal cycles can be taken into account in this case. A representative temporal operating variable profile can now be assigned to each of the cycle profiles so that a combined predicted operating variable profile results from the reduced usage pattern.

In step S3, modified predicted operating variable profiles are created starting for a number of specified charging strategies. For this purpose, an assigned representative operating variable profile is specified for each charging strategy. Thus, at least two charging strategies and their influence on the operating variable profiles, which can comprise a current profile, temperature profile and voltage profile, are simulated and predicted in a scenario-based manner.

The time segments with charging cycles from the predicted operating variable profile are each replaced by a corresponding operating variable profile which is assigned to the specified charging strategy. A modified operating variable profile is obtained for each of the specified charging strategies. When assigning the charging strategy to a profile of the battery current, it is possible to use a charging profile that indicates a maximum permissible battery current depending on a charging state. In contrast, the profile of the battery temperature during the charging phase can be determined by means of a thermal simulation model in order to describe the replaced charging temperature profiles. The simulation model can in this case take into account the calendar time, so that seasonal temperature fluctuations are taken into account.

For determining the relevant predicted operating variable profile, a battery current profile and a temperature profile can be artificially generated from the usage pattern. By means of a battery performance model, a corresponding voltage and charging state response to the load variables determined by the battery current profile and the temperature profile can be determined in order to thus determine a predicted operating variable profile for an aging state model based on a time integration method.

As a result, a modified operating variable profile which corresponds to an artificially generated predicted operating variable profile is obtained for each of the specified charging strategies.

In step S4, based on the modified operating variable profiles, aging indications in the form of aging states after a time period indicated by a prediction horizon or a profile of the aging state are now predicted by means of a time series simulation using an aging state model or a remaining service life (time period until a specified aging state of, for example, SOH-C=0.8 is reached). Thus, at least two charging strategies and their influence on the battery aging are simulated and evaluated in the form of a prediction of the aging behavior in a scenario-based manner. The prediction of the aging state can relate to the capacity-related aging state and/or the resistance change-related aging state.

Such an aging state model can, for example, supplement or consolidate the historical operating variable profile and the relevant predicted operating variable profile in order to determine the aging state in each case, time step by time step, e.g., starting from an aging state at the time of the initial operation. This aging state model can be implemented in a purely data-based manner but also as a hybrid data-based aging state model. Such an aging state model may, for example, be implemented in a central unit (cloud) and can be parameterized or trained by means of operating variables of a plurality of energy stores of various devices that are in communication connection with the central unit.

The simulation results correspond in each case to an aging state profile which indicates the previous aging state profile and, from the current evaluation time, a predicted aging state profile. These aging state profiles are subsequently compared with the real aging behavior, wherein the simulated aging state profiles can indicate a target aging or an aging state trajectory that is not to be undershot.

An exemplary aging state model for determining aging states can be provided in the form of a hybrid aging state model, i.e., a combination of a physical aging model with a data-based model. In a hybrid model, a physical aging state can be determined by means of a physical or electrochemical aging model, wherein a correction value resulting from a data-based correction model is applied to the physical aging state, in particular by addition or multiplication. The physical aging model is based on electrochemical model equations that characterize electrochemical states of a non-linear differential equation system, calculate them continuously, and map them to the physical aging state for output, as SOH-C and/or as SOH-R. The driver-specific consolidated operating variable profile, in particular a battery current or a battery temperature, is applied on the input side to this hybrid aging state model.

Furthermore, the correction model of the hybrid data-based aging state model may be designed with a probabilistic or artificial intelligence-based regression model, in particular a Gaussian process model, and may be trained to correct the aging state obtained by the physical aging model. For this purpose, there is consequently a data-based correction model of the aging state for correcting the SOH-C and/or at least one further correction model for correcting the SOH-R.

However, other models that can determine an aging state of the vehicle battery based on operating variable profiles can also be considered as aging state models.

As a result of step S4, an aging state according to a prediction horizon, a temporal aging gradient or a remaining service life are now available as an aging indication for each of the charging strategies considered.

As a result, an aging indication, which may, for example, correspond to a mean aging gradient determined from the aging trajectory and/or a remaining service life until a specified aging state (e.g., SOH=0.8) is reached, can be assigned to each of the various charging strategies.

Figure 3:
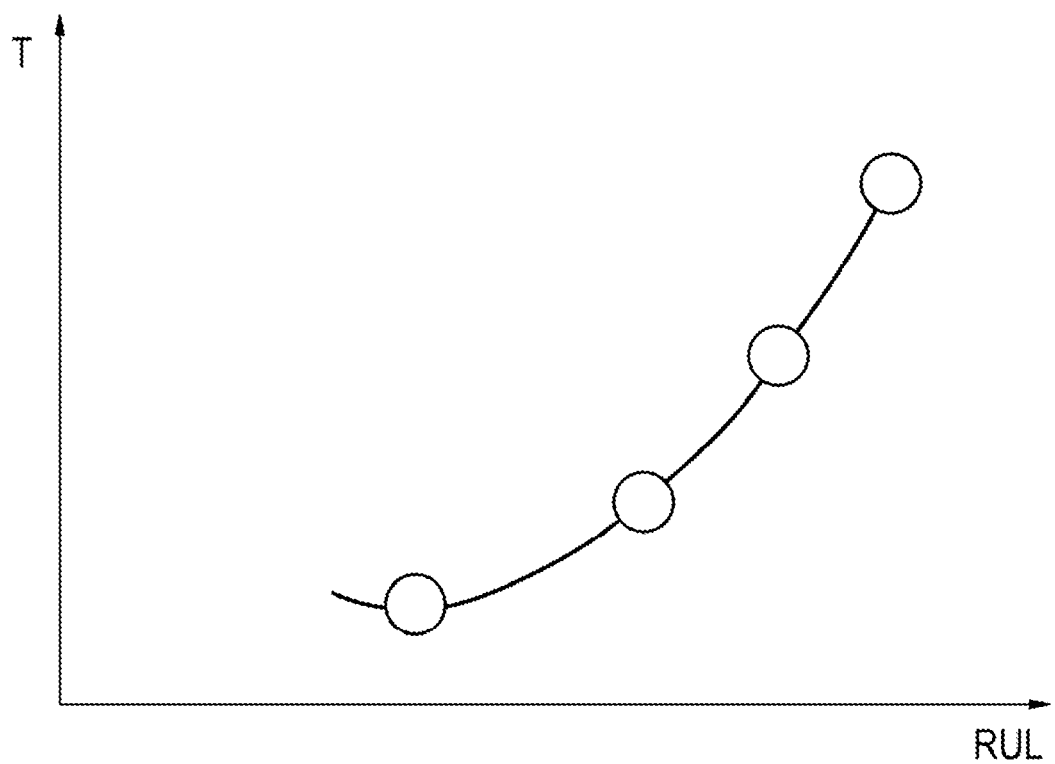
FIG. 3 is an exemplary representation of a display for selecting a suitable charging strategy for the vehicle battery of the user vehicle.

The results of this simulation can be indicated in step S5 as a Pareto front of a user interface 6. For example, a representation of the Pareto front, as shown in FIG. 3, can be displayed on a smartphone. The points correspond to the various charging strategies that the user can select by tapping on the touch input option, for example.

The diagram shows the expected charging times T as a characteristic variable for each of the charging strategies for an aging indication which corresponds in the example shown to a predicted battery service life RUL.

In step S6, a check is correspondingly made as to whether a user input by which a specific charging strategy has been selected from the various charging strategies has taken place. If a selection was made (alternative: yes), the corresponding charging strategy is applied in step S7 to future charging processes. Otherwise (alternative: no) there is a jump back to step S1. If a selection is made, the driver-specific load profile is now specified completely by the charging strategy.

The determination of the aging indication for the various charging strategies can, for example, be updated once a month, wherein the usage patterns are re-determined from the historical operating variable profiles.

In step S8, the predicted aging state trajectory is determined according to the selected charging strategy or taken from the previous simulation. The selected charging strategy can be transmitted by software update from a cloud to the vehicle in a controlled manner, where it is interpreted close to the battery. The interpretation of the charging strategy can take place in an embedded manner without a cloud connection.

In step S9, the actual aging profile can be checked against the aging state trajectory predicted by the selected charging strategy, in order to determine an undershooting (SOH-C) or exceeding (SOH-R) of a limit value, indicated by the predicted aging state trajectory, by the actual aging state. The user is in this case incorporated into the control loop, wherein the predicted target trajectory serves as a selected SOH reference for the model predictive control of the aging trajectory.

In step S10, it is checked whether the limit value has been undershot by the actual aging state. If this is the case (alternative: yes), the method is continued with step S11. Otherwise (alternative: no) there is a jump back to step S1.

In step S11, the user is prompted to select a charging strategy. In the process, a recommendation for a new charging strategy which represents a lower load on the vehicle battery can be displayed. Subsequently, the method is continued with step S5 in order to give the user the option of a new selection of the charging strategy.

Figure 4:
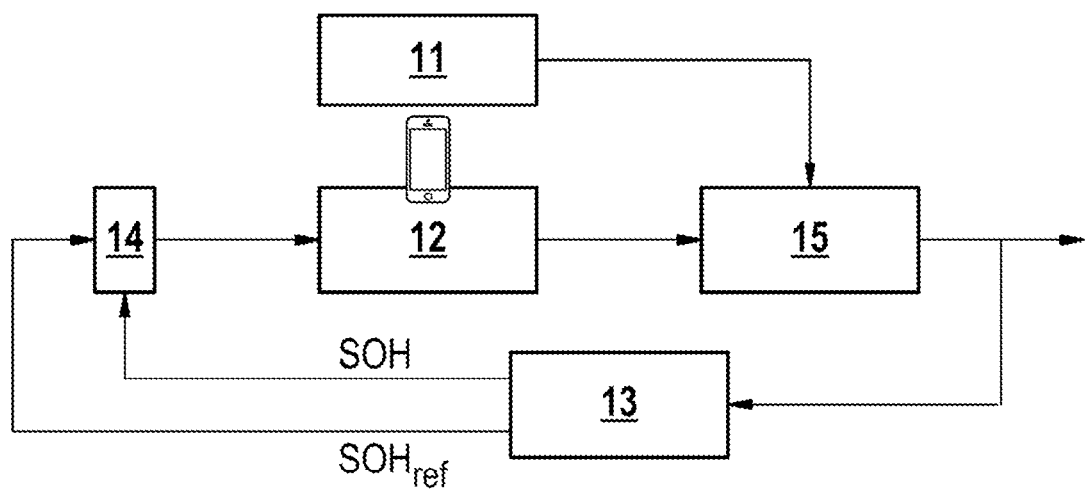
FIG. 4 shows a functional diagram for representing the incorporation of the user into the specification of the charging strategy.

FIG. 4 shows by way of example that the user is incorporated into a control loop. For this purpose, the usage pattern from a usage pattern model 11 is supplemented in the control device 5 by a charging curve corresponding to the selection of a charging strategy made by a user input at a user interface 6. This usage pattern supplemented by the corresponding charging curve can be transmitted to a central unit 13 external to the vehicle. The central unit 13 external to the vehicle determines a predicted operating variable profile and accordingly a predicted aging state trajectory $SOH_{ref}$ from the modified usage pattern. Furthermore, a current aging state SOH can be determined in the vehicle or in the central unit 13 from the historical operating variable profiles. If it is determined in a comparison block 14 that the current aging state SOH deviates from a predicted aging state according to the predicted aging state trajectory in the sense of a higher load, the user is signaled accordingly via the user interface 6. As described above, the user can then be prompted again to specify the charging strategy and thus functions as part of a "control" of the aging behavior.

Alternatively, in step S11, the charging strategy can be updated automatically, in particular with a charging strategy which represents a lower load on the vehicle battery.

In addition, a confidence or a safety measure of the predicted remaining service life can be specified via the user interface 6, which takes into account the confidences of the operating variable profiles determined from the modified usage pattern and the confidence of the aging state model used, so that a corresponding confidence of the determined predicted remaining service life can be indicated to the user for the relevant charging strategy.

What is claimed is:

1. A computer-implemented method for operating a user interface for specifying a charging strategy for charging a device battery of a battery-operated device, the method comprising:
   detecting a historical usage pattern of an operation of the device battery;
   specifying a plurality of different charging strategies, each of the charging strategies having a corresponding charging curve for charging of the device battery;
   determining an aging indication for each of the charging strategies based on (i) the historical usage pattern, and (ii) an assumption that all future charging processes for charging the device battery are performed using a relevant charging strategy of the plurality of different charging strategies;
   informing a user about a relevant characteristic variable for each of the charging strategies and the respectively associated aging indication; and
   specifying one of the charging strategies for future charging processes corresponding to a received user selection.

2. The method according to claim 1, further comprising:
   specifying the charging strategies by a maximum permissible charging current, a charging time, or a charging profile for specifying a maximum permissible charging current depending on a charging state,
   wherein the relevant characteristic variable for the charging strategies corresponds to the charging time, and
   wherein the charging time corresponds to a specified increase in the charging state.

3. The method according to claim 1, wherein:
   the historical usage pattern is indicated by a temporal operating variable profile of at least one operating variable, and
   the at least one operating variable includes at least one of a battery current, a battery voltage, a battery temperature, and a charging state.

4. The method according to claim 3, further comprising:
   predicting the temporal operating variable profile by replacing profile sections of predicted charging processes in each case by an operating variable profile assigned to the specified charging strategy,
   wherein the aging indication is determined according to an aging state model based on a time integration method, depending on the predicted operating variable profile or on an operating variable profile from a consolidation of the historical operating variable profile and the predicted operating variable profile.

5. The method according to claim 4, wherein the aging indication corresponds to a mean aging gradient, a predicted aging state trajectory, a remaining service life, or an aging state after a predetermined period of time.

6. The method according to claim 1, wherein the user interface provides an input option via which the user can select one of the charging strategies.

7. The method according to claim 1, wherein the relevant characteristic variable for the charging strategy and the aging indication for the charging strategies is displayed via the user interface in the form of a Pareto-optimal curve, which is formed for at least two charging strategies which are Pareto-optimal in a conflict of objectives between aging and charging time of the device battery.

8. The method according to claim 1, wherein:
   a predicted aging state trajectory is provided according to the selected charging strategy,
   an automatic adjustment of the charging strategy to a charging strategy with a lower load for the device battery takes place or a user is prompted to change the charging strategy when a limit value of the aging state indicated by the predicted aging state trajectory is violated by an actual aging state.

9. The method according to claim 1, wherein a computer program product comprises instructions which, when the computer program product is executed by at least one data processing device, cause the data processing device to carry out the method.

10. The method according to claim 9, wherein the computer program product is stored on a non-transitory machine-readable storage medium.

11. A user interface configured to carry out the method according to claim 1.

* * * * *